Figure 2:
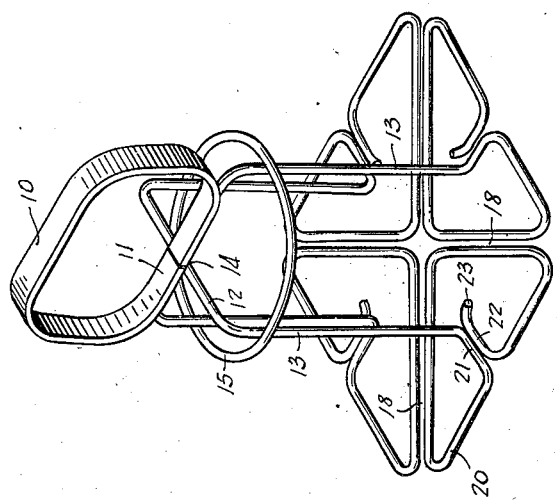

March 31, 1942.          I. SEGAL          2,277,888
SANDWICH CUTTER GUIDE
Filed Aug. 10, 1940

INVENTOR.
ISADORE SEGAL.
BY Joshua R H Potts
ATTORNEY

Patented Mar. 31, 1942

2,277,888

UNITED STATES PATENT OFFICE 2,277,888

SANDWICH CUTTER GUIDE

Isadore Segal, Philadelphia, Pa.

Application August 10, 1940, Serial No. 352,075

2 Claims. (Cl. 146—150)

This invention relates to sandwich cutter guides and is concerned primarily with a device of this type which not only guides the cutting operation, but also facilitates compressing of the sandwich.

At the present time many luncheonettes, drug stores, restaurants, and similar places do an extensive business in so-called "combination sandwiches". Such sandwiches ordinarily comprise either two or three slices of bread or toast, together with a variety of sandwich fillers. After the several fillers and the slices of bread or toast have been assembled, there is usually formed a high built up structure which ordinarily is compressed by the sandwich maker to render the same more compact, this compressing usually taking place just prior to cutting of the sandwich into component parts.

The buying public practically demands that the sandwich be cut up into the plurality of parts, and it has been the practice to maintain each of the several parts of the sandwich assembled as a unit by employing a toothpick to skewer the several pieces of each sandwich part together.

With the foregoing conditions in mind this invention has in view, as its foremost objective, the provision of a device which is intended to be grasped by a sandwich maker, and which is readily adapted to being applied to a sandwich to compress the same.

A further object is to provide such a device which is adapted to hold the sandwich in a compressed condition, and while so holding the sandwich act as a guide for cutting the sandwich into a plurality of parts.

Yet another object is the provision of a device of the character above noted which also includes guide means for indicating where toothpicks are to be inserted to hold the several pieces of each sandwich part together.

In carrying out the above noted objectives the invention has in mind the provision of a device including a handle, and from which handle depends a plurality of legs. Each leg carries, at its foot, a structure which is designed to engage the sandwich and mark off one of the individual sandwich parts. Thus if the sandwich is to be divided into four parts it will have four legs depending from the handle structure, and the foot of each leg carries structure designed to engage one quarter of the sandwich.

More in detail this invention has in view, as an object, the provision of a device of the character above noted in which a triangular shaped base plate is carried at the foot of each leg.

Still more in detail the invention has in view, as an object, the provision of such a device in which each base plate is formed with an opening through which a toothpick is adapted to be inserted.

To the end of providing a device which may be made as cheaply as possible, and yet be capable of use in the manner desired, the invention has in mind the provision of a wire structure at the foot of each leg which is integrally joined to the leg, the base structure being made from this same piece of wire that is employed in the manufacture of the leg.

Various other more detailed objects and advantages of the invention will in part become apparent, and in part be hereinafter stated, as the description of the invention proceeds.

The invention, therefore, comprises a sandwich cutter guide consisting of a handle. Depending from the handle are a plurality of legs. Carried at the foot of each leg is structure designed to engage the sandwich, there being one of these base structure elements for each part into which the sandwich is to be cut. Each of these base structure elements includes guide means for aiding in the insertion of a toothpick. In one form of the invention the base structure takes the form of a plate of proper shape, which is secured to the foot of each leg, and which is formed with an opening at an appropriate point through which a toothpick may be inserted. In another form the base structure is formed as an integral continuation of the wire used in making the leg.

Figure 1:
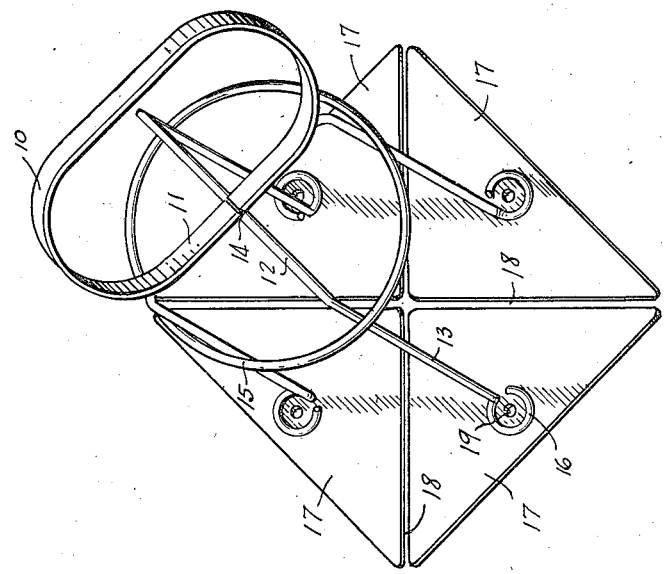

For a full and more complete understanding of the invention reference may be had to the following description and accompanying drawing, wherein Figure 1 is a perspective view of a sandwich cutter guide which is made in accordance with the precepts of this invention, and Figure 2 is a similar view in modified form.

Referring now to the drawing, wherein like reference characters denote corresponding parts, and first more particularly to Figure 1, the sandwich cutter guide of this invention is shown as comprising a handle 10 which may be of any suitable size or shape, and which, in the illustrated embodiment, takes the form of a loop having a bottom 11. Secured to the underface of this bottom 11, in any preferred manner such as by being welded or soldered thereto, are turned-over end portions 12 of legs 13.

The sandwich cutter illustrated in the drawing and herein described is shown as including four legs 13, with the turned-over ends 12 radially arranged and spaced 90° apart. It is evident that the number of legs employed may vary in accordance with the requirements as to the number of parts into which a sandwich is to be cut. Thus, if a sandwich is to be cut into only three parts, three of the legs 13 would be employed, and if the sandwich is to be cut into a number of parts in excess of four, a correspondingly greater number of legs would be included in the handle structure. The inner meeting extremities of the turned-over ends 12 may be joined together and to the bottom 11 of the handle 10 as by a soldered joint represented at 14.

In order to impart desired properties of strength and rigidity to the structure, a reinforcing ring 15 is shown as encircling the legs 13, and each of the legs 13 may be joined to the ring 15 in any preferred manner, such as by being soldered thereto.

Each leg 13 terminates at the bottom in a curled foot 16, and to this foot 16 is secured a base plate element 17, the joinder of the parts 16 and 17 being effected in any preferred manner, such as by soldering.

While the size and shape of the base plate element 17 may vary, the invention has particularly in mind the employment of four base plate elements 17 each of which is of the triangular formation illustrated, and which complement the other base plate elements to define a square. It will be noted that the base plate element 17 carried by one leg 13 is spaced a predetermined distance from the next adjacent elements so as to define guide slots 18.

Each of the base plate elements 17 is also formed at an appropriate point with an opening 19 which is intended as a guide for aiding in the insertion of a toothpick. It will be noted that this opening 19 is within the curled foot 16, and thus is substantially immediately at the bottom of each of the legs 13. Thus the leg 13 also may aid a sandwich maker who is in great haste in inserting the toothpicks.

When the device shown in Figure 1 and above described is to be employed, the sandwich maker first constructs the sandwich in the usual way by properly arranging the slices of bread or toast and the sandwich fillers. He then grasps the handle 10 and brings the several base plate elements 17 into engagement with the top of the sandwich. As pressure is placed on these elements the sandwich is compressed to a required degree. Toothpicks are now skewered into the sandwich by being inserted through the openings 19. The sandwich maker then cuts the sandwich into quarters by passing a knife through the slots 18. Upon removal of the device each sandwich part will be properly compressed and held together by one of the toothpicks. Moreover, a very nice appearance in the completed product will be afforded because of the accurate guiding of the cutting operations.

In the form of the invention shown in Figure 2 the structure of Figure 1 is followed so far as handle 10, legs 13, turned-over ends 12 and reinforcing ring 15 are concerned. However, in lieu of the base plate element 17 it will be noted that each of the legs 13 carries, at its bottom, a wire base element structure consisting of a triangular wire framework 20 that is connected to its respective leg 14 by an inwardly extending arm 21.

Immediately adjacent the inwardly extending arm 21 is another arm 22 having an inturned end 23 which cooperates with the leg 13 to serve as a toothpick insertion guide. While each base framework 20 may be of any size or shape, the invention has particularly in mind an arrangement in which four triangular frameworks are assembled so that they complement each other to define the usual square, and each framework is slightly spaced from the adjacent frameworks to provide the sandwich cutting slots 18 in the manner above described in connection with Figure 1.

The sandwich cutter shown in Figure 2 is used in exactly the same manner as is the device of Figure 1, with the possible slight exception that rather than insert the toothpicks through the openings 19, they are inserted at the inturned end 23 of the arm 22.

While preferred specific embodiments of the invention are hereinbefore set forth it is to be clearly understood that the invention is not to be limited to the exact constructions illustrated and described, because various modifications of these details may be provided in putting the invention into practice within the purview of the appended claims.

I claim:

1. A device of the character described comprising a handle, four legs depending from said handle, and a base structure carried at the foot of each leg, the base structure on one leg being spaced from the base structure of each adjacent leg to define a sandwich cutting slot whereby the four base structures carried by the said four legs provide intersecting diagonal slots.

2. A device of the character described comprising a handle, four legs depending from said handle, and a base structure carried at the foot of each leg, the base structure on one leg being spaced from the base structure of each adjacent leg to define a sandwich cutting slot whereby the four base structures carried by the said four legs provide intersecting slots, each of said base structures including means for guiding the insertion of a toothpick.

ISADORE SEGAL.